United States Patent [19]

Ono

[11] 3,978,698
[45] Sept. 7, 1976

[54] LOCK ASSEMBLY
[75] Inventor: Zensuke Ono, Izumi, Japan
[73] Assignee: Izumi Jiko Co., Ltd., Izumi, Japan
[22] Filed: Sept. 2, 1975
[21] Appl. No.: 609,549

Related U.S. Application Data
[63] Continuation of Ser. No. 496,631, Aug. 12, 1974, abandoned.

[30] Foreign Application Priority Data
Mar. 18, 1974 Japan................................ 49-31346

[52] U.S. Cl.................................... 70/165; 70/229; 70/231; 70/232; 70/276
[51] Int. Cl.² .......................................... F16B 41/00
[58] Field of Search ............ 70/165, 169, 229, 231, 70/232, 260, 276, 413

[56] References Cited
UNITED STATES PATENTS

| 1,625,901 | 4/1927 | Lay | 70/232 |
| 1,786,332 | 12/1930 | Bradshaw | 70/165 |
| 1,900,146 | 3/1933 | Winkler | 70/232 |
| 3,540,245 | 11/1970 | Pope | 70/231 |
| 3,837,195 | 9/1974 | Pelto | 70/276 |

Primary Examiner—Paul R. Gilliam
Assistant Examiner—Carl F. Pietruszka
Attorney, Agent, or Firm—Griffin, Branigan and Butler

[57] ABSTRACT

A lock assembly useful in coupling a tire assembly to a wheel which is locked and unlocked by a magnetic key.

3 Claims, 5 Drawing Figures

LOCK ASSEMBLY

This is a continuation of application Ser. No. 496,631, filed Aug. 12, 1974 now abandoned.

BACKGROUND OF THE INVENTION

This invention relates to a lock assembly to couple a tire and wheel assembly, as mounted on a vehicle, such as an automobile, in a manner to ensure safety against theft.

Deluxe automobiles often include the mounting of expensive tires and wheels on the automobile. Thieves direct their attention to these expensive items and theft thereof is frequent. Heretofore, for safety against theft, car drivers have generally used key inserted or activated cylinder locks which are applied to the locking bolts or nuts of the wheel. These key activated devices have the drawbacks of being easily unlocked or "picked" by hair pins or the like.

BRIEF SUMMARY OF THE INVENTION

An object of this invention is to remove the picking drawbacks from the locks and to provide cylinder locks activated by magnetic force. The lock of the present invention has no key hole to ensure against theft of the tire and wheel by use of not only hair pins or the like, but by commercially available magnets.

According to this invention, a wheel bolt or nut is covered by a conical shell loosely and rotatably mounting above the entire periphery of the bolt or nut so that the loose rotatable shell cannot be grasped by any tool such as a spanner wrench or other device. As a result, a wrench, etc. cannot directly contact the bolts or nuts for removal. One can manipulate the lock assembly of the present invention only by use of a magnet key having a predetermined configuration.

DESCRIPTION OF THE PREFERRED EMBODIMENTS

Figure 3:
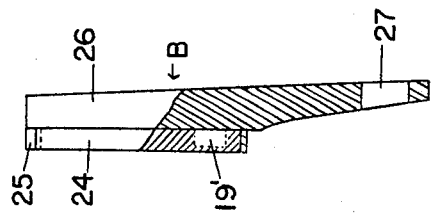
FIG. 3 is a longitudinal partial side sectional view of a key member to actuate the lock of FIG. 1.

Hexagonal nut 1 (FIG. 1 and FIG. 4) is threaded to a wheel bolt. This nut however, may be interchanged with a bolt. The forward interior portion of nut 1 has a cavity 3 to accomodate a cylinder lock body A. A groove 2 is bored on the inner periphery of cavity 3 to engage the tips of two latch bars 16, 17, which are normally thrust in an up and down position, respectively, from the cylinder lock body A. A cylindrical or conical shell 4 is loosely and rotatably mounted around the hexagonal nut 1. This shell 4 includes, in the forward interior portion thereof, an inner peripheral lug 5, the rear side of which abuts the front side of hexagonal nut 1.

Figure 2:
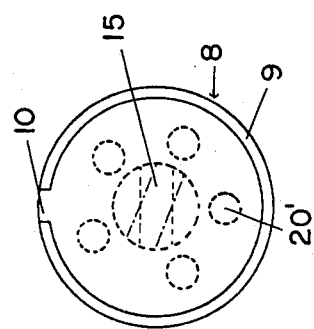
FIG. 2 is an end view of FIG. 1.
Figure 5:
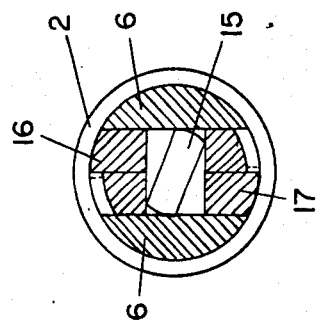
FIG. 5 is a similar view to FIG. 4, but under an unlocked condition.

The cylinder lock body A according to this invention comprises a socket member 6 and a plug member 7 in the forward face of the lock body and in contact with each other. The respective socket and plug members are preferably manufactured from non-magnetic materials such as copper, brass or gun metal. As shown best in FIG. 1 and FIG. 2, the plug member 7 includes a front recessed member 8 to receive a key member B (FIG. 3), and an outer flange 9 on the circumference of front member 8. Flange 9 is partly cut to define a removed portion 10. As shown best in FIG. 1, the front member 8 includes a sliding lug 11 on the rear side thereof, whereas the front side of the socket member 6 has a circumference corner partly removed to provide an arched rail 12. In accordance with the present invention, the plug member 7 embraces the socket member 6 in face contact with each other and rotates along a predetermined arc or angle by means of the arched rail 12 and sliding lug 11. The socket member 6 also includes a peripheral shoulder opposed to the peripheral lug 5 of shell 4 on which shoulder at least one slot is radially bored to receive a retaining pin 13 to prevent the lengthwise separation of the plug member 7 from the socket member 6. In addition, the peripheral shoulder is integrally provided with at least two projections 14 (only one illustrated) close to the peripheral lug 5 of shell 4, to connect the cylinder lock body A with the shell 4 to the side of the projections from the rear and interior of the shell. In this manner, the cylinder lock body A can be immovably fitted into the interior of the shell 4. The socket member 6 includes a cylindrical opening along the axis thereof across which opening a second transverse opening extends. The plug member 7 includes a central axle, which is passed through the central opening of the socket member 6. A block 15 is placed on the bottom portion 21 cut on the front side of latch bars 16, 17 and is in contact with the upper and lower walls of the respective latch bars. Pin slots 20, of a predetermined number, are bored and spaced on the front side face of the socket member 6 and extends into the opposed end face of the plug member 7 to accomodate a spring 18 and a magnet pin 19 therein. In the embodiment illustrated, five pin slots 20 are provided as shown in FIG. 2. The pair of latch bars 16, 17 disposed in the transverse opening of the socket member 6 and the two cut bottom portions 21 are positioned side to side on the front and center sides of the respective latch bars. The guide block 15 is placed across the bottom positions as best shown in FIG. 4 and FIG. 5. In addition to the rear of latch bars 16, 17, an inverted L-cut is provided on the inner and longer side to define a flute 22 which receives a coil spring 23 in a normally expanded position. When this spring is expanded, the latch bars 16, 17 are thrusted up and down, so that their tips can be latched with the inner peripheral groove 2 of nut 1, to perform the locking operation.

Figure 4:
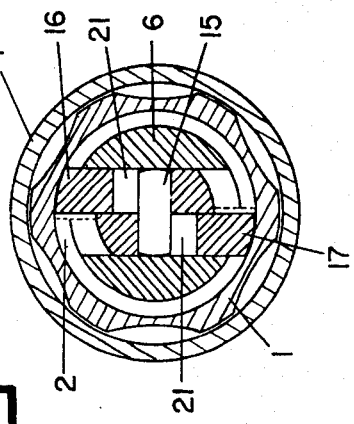
FIG. 4 is a cross-sectional view taken along line A—A of FIG. 1 of the lock when in a locked condition.

FIG. 3 represents the key member B to actuate the lock of the present invention. This key member includes a front key disc in which magnet pins 19' are embedded and positioned to oppose the identical magnetic poles of the magnetic pins 19 positioned in the cylinder lock body A. The key member also includes a key casing 26 having a projection 25 on the front circumference, which projection mates with the eliminated portion 10 of the front recessed member 8. A hole 27 on the leg of key member 13 receives a suitable string or ring.

Figure 1:
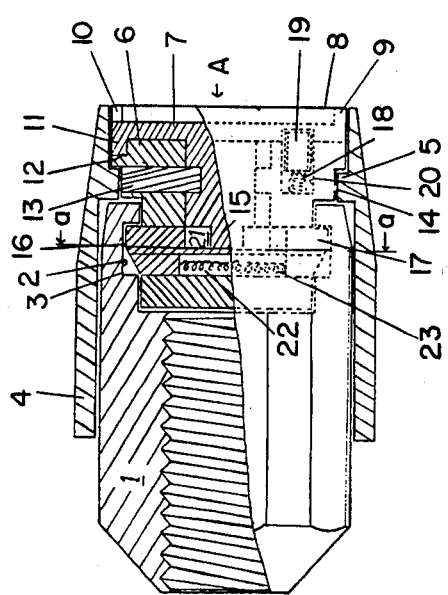
FIG. 1 is a longitudinal partial side sectional view of an embodiment according to this invention.

According to the present invention, a tire and wheel are coupled by threading a wheel bolt having a partly exposed nut 1. This nut in turn, is locked within the cylinder lock body A and is covered with the shell 4 so that safety against theft is insured. When the lock is positioned on the nut, the up and down thrusted tips of the latch bars 16, 17 are forced together as a result of the surfaces on the back of the latch bars. The latch bars then abut the front side and engage the inner groove 2 of nut 1 under, as shown in FIG. 1 and FIG. 4. In this position, the spring 23 disposed in the flute 22, defined by the opposed combination on the rear side of two latch bars 16, 17 is fully expanded. The spring 18 is positioned in the cylinder lock body A, is also expanded and the magnet pins 19 extend into the pin slots 20' bored in the rear side of recessed member 8 to render the plug member 7 and socket member 6 immovably fixed together.

According to the present invention, the cylinder lock body A is opened by positioning the key projection 25 shown in FIG. 3 with the removed portion 10 shown in FIG. 1 and FIG. 2. As a result, the magnet pin 19' embedded in the key disc 24 are aligned with the identical magnetic poles in the magnet pins 19 positioned in the cylinder body A to cause a repulsion force. The magnetic pins are thus forced to overcome force against the spring 18 and travel back into the pin slots 20 of the socket member 6 and compress the spring 18. This allows the plug member 7 to rotate with its sliding lug along the arched rail of the socket member 6 a predetermined distance. The key projection 25 in contact with the removed portions 10 can then be rotated clockwise the same distance. As a result, the guide block 15, attached to the rear side of the plug member 7, is rotated and pushes up the latch bars 16, 17 together as shown in FIG. 5. The latch bars 16, 17 are thus forced to overcome force against spring 23 disposed in the central flute 22 on the rear side thereof and their tips are drawn into the transverse opening in the socket member 6. As a consequence, the tips of the latch bars 16, 17 are no longer engaged with the inner groove 2 of nut 1 and the key member B and the shell 4 together with the cylinder body A connected in the interior of the shell 4 can be pulled forward. The key disc 24 is manufactured from aluminum or the like material having magnetic permeability. Since, the unlocking operation is carried out by magnetic action by two spaced magnetic pins 19, 19', it is impossible to use commercially available magnets for such unlocking operation and the safety against the theft of tire and wheel is ensured. It is also an advantageous feature of the present invention that many varied locking devices can be manufactured by varying the number and position of pin slots bored on the opposed faces of the socket and plug members the distance of the removed section along the circumferential corner of the front socket member, and the dimension of the cut bottoms on the front sides of the latch bars and the guide block in combination thereacross.

What I claim is:

1. A lock assembly comprising, in combination:

a magnetic key including a round casing for defining a relatively flat key cavity being open on one side thereof, and including at least one magnet embedded in a material deposited in said key cavity, said magnet being covered by said material on said open side of said key cavity, said round casing having a basically round outer surface but including at least one projection thereon;

a nut defining a nut cavity and a peripheral groove about said nut cavity;

a shell detachably and rotatably mountable on said nut; and a lock body attached to said shell for securing said shell about said nut in a locked state, said nut cavity being adapted to receive said lock body, said lock body including a socket member having at least one first pin slot and an arched rail along the perimeter thereof, a round plug member having a central axle portion extending through a central opening in said socket member and having a relatively flat portion covering, and in sliding contact with, the outer surface of said socked member, said flat portion defining at least one second pin slot, said lock body further including at least one magnetic pin means operable within said first and second pin slots for selectively locking said plug member with respect to said socket member, said first and second pin slots substantially aligning in said locked state, said plug-member central-axle portion including at the end thereof a flat, elongated guide block extending transverse to said axle portion, said lock body further having latch means for securing said lock body within said cavity, said latch means being operable between an extended locking state and a retracted state, and bias means for biasing said latch means towards said extended locking state, said latch means lockingly engaging said peripheral groove in said locked state, said latch means defining a latch slot on its upper surface, said guide block, extending into said latch slot and thereby engaging said latch means, said plug-member flat portion including recess walls for defining a substantially round, key-receiving, plug-member recess for receiving said magnetic-key round casing, including said projection when it is in a particular orientation relative to said plug member, said magnetic key and said key-receiving plug member thereby cooperatively defining means for rotating said plug member, said plug member on an inner surface thereof, including a lug slidably engaging said arched rail to cooperatively define means for limiting rotation of said plug member and said guide block between a first guide position and a second guide position, said latch means being moveable between said extending locking state and said retracted state in response to rotation of said guide block, said latch means being in said extended locking state and said retracted state whenever said plug member is in said first guide position and said second guide position, respectively, said magnetic pin means being operable between a normally operative state wherein said plug member is locked and an inoperative state wherein said plug member is freed to rotate in response to said magnetic-key being positioned in said plug-member recess, whereby said plug member is responsively rotatable by said magnetic key.

2. A lock assembly as claimed in claim 1 wherein said latch-means slot for receipt of said guide block has at least one side, said guide block engaging said side whenever said plug member is rotated by said magnetic key to urge said latch means towards said retracted state and overcome said bias means.

3. A lock assembly as claimed in claim 1 wherein latch means includes a pair of latch bars having tips to lockingly engage said peripheral groove.

* * * * *